(12) United States Patent
Huang et al.

(10) Patent No.: US 12,496,322 B2
(45) Date of Patent: Dec. 16, 2025

(54) **METHOD FOR REGULATING BLOOD GLUCOSE, LOSING WEIGHT, AND REDUCING PRODUCTION OF ADVANCED GLYCATION END PRODUCTS BY USING *SACCHAROMYCES CEREVISIAE* TCI907 OR SUPERNATANT THEREOF**

(71) Applicant: TCI CO., LTD., Taipei (TW)

(72) Inventors: Chu-Han Huang, Taipei (TW);
Yung-Hsiang Lin, Taipei (TW)

(73) Assignee: TCI CO., LTD., Taipei (TW)

( * ) Notice: Subject to any disclaimer, the term of this patent is extended or adjusted under 35 U.S.C. 154(b) by 0 days.

(21) Appl. No.: 18/422,022

(22) Filed: Jan. 25, 2024

(65) Prior Publication Data
US 2025/0075168 A1   Mar. 6, 2025

Related U.S. Application Data

(62) Division of application No. 16/993,280, filed on Aug. 14, 2020, now abandoned.

(60) Provisional application No. 62/886,397, filed on Aug. 14, 2019.

(51) Int. Cl.
| | | |
|---|---|---|
| *A61K 36/064* | (2006.01) | |
| *A61K 35/66* | (2015.01) | |
| *A61P 3/04* | (2006.01) | |
| *A61P 3/08* | (2006.01) | |
| *C12N 1/18* | (2006.01) | |
| *C12R 1/865* | (2006.01) | |

(52) U.S. Cl.
CPC ............ *A61K 36/064* (2013.01); *A61K 35/66* (2013.01); *A61P 3/04* (2018.01); *A61P 3/08* (2018.01); *C12N 1/18* (2013.01); *C12N 1/185* (2021.05); *C12R 2001/865* (2021.05)

(58) Field of Classification Search
CPC .......... C12N 1/185; C12N 1/18; A61K 35/66; A61P 3/04; A61P 3/08; C12R 2001/865
See application file for complete search history.

(56) References Cited

PUBLICATIONS

Liu, L et al. Antidiabetic effect of high-chromium yeast against type 2 diabetic KK-Ay mice. Journal of Food Science. 2018. 83(7):1956-1963. Published on Jul. 3, 2018. (Year: 2018).*

Fratianni, F et al. Ability of synbiotic encapsulated *Saccharomyces cerevisiae* boulardii to grow in berry juice and to survive under simulated gastrointestinal conditions. 2014. 31(3): 299-305. (Year: 2014).*

Pinu, FR et al. Metabolite secretion in microorganisms: the theory of metabolic overflow put to the test. Metabolomics. 2018. 14:43. Published online Mar. 2, 2018. (Year: 2018).*

* cited by examiner

*Primary Examiner* — David W Berke-Schlessel
*Assistant Examiner* — Susan E. Fernandez
(74) *Attorney, Agent, or Firm* — Chieh-Mei Wang

(57) ABSTRACT

Methods for regulating blood glucose, losing weight, or reducing production of advanced glycation end products comprising administering to a subject in need thereof a composition containing an effective amount of *Saccharomyces cerevisiae* TCI907 and/or a metabolite thereof. The *Saccharomyces cerevisiae* TCI907 is deposited at the German Collection of Microorganisms and Cell Cultures under an accession number of DSMZ33480.

4 Claims, 5 Drawing Sheets
Specification includes a Sequence Listing.

SEQUENCE LISTING

```
Sequence total quantity: 5
SEQ ID NO: 1          moltype = DNA  length = 811
FEATURE               Location/Qualifiers
source                1..811
                      mol_type = genomic DNA
                      note = TCI907
                      organism = Saccharomyces cerevisiae
SEQUENCE: 1
cgaatttaat aattttgaaa tggattttt ttttttggct tgagcatgac agcttttact    60
gggcaggaaa acagagatgg aaagtccagc cgggcctgcc cttaactgcg cggtcttgct   120
```

```
aggcttgaag tttctttctt gctattccaa acggagagag atttctgtgc ttttgttata    180
ggacaattaa aaccatttca atacaacaca ctgcggagtt ttcttatctt tgcaacttt     240
tctttgggca ttcgtcaatc ggggggggcca caggtaacaa acacaaacaa ttttatctat   300
tctttatatt ttttcaaaa acaacaattt tcttaactgg aaattttaa atattaaaaa      360
ctttcttcaa cggatctctt gttctcccct cgatgaagaa cacagcgaaa tgcgatacgt    420
aatgtgaatt gcagaatacc gcgaatcatc aaatctttga acacacattg cgccccccgg    480
tattccacgg ggcatgcctg tttgagcgca tttctttctc aaacattctg tttggtggtg    540
agtgatactc tttggagtaa acttgaaatt gctggccttt tcattggatg ttttttttct    600
taacaaaggt ttctctgcct gcttgaggta taatgaagta cggtcgttct atgtttgacc    660
aactgcggct aatctttctt attctgagcg tattgtaacg ttatctataa gatgagacca    720
tctaggcgaa caaagttctg ttagtttgac ctcacatcaa gtggagtacc cgctgaactt    780
aagcatatca cagcggggggg gggggggggg a                                  811

SEQ ID NO: 2             moltype = DNA   length = 823
FEATURE                  Location/Qualifiers
source                   1..823
                         mol_type = genomic DNA
                         note = Y01
                         organism = Saccharomyces cerevisiae
SEQUENCE: 2
cccgggcctc tacctgattt gaggtcaact ttaagaacat tgttcgccta gacgctctct    60
tcttatcgat aacgttccaa tacgctcagt ataaaaaaga ttagccgcag ttggtaaaac    120
ctaaaacacc gtacttgcat tatacctcaa gcacgcagag aaacctctct ttggaaaaaa    180
aaaacatcca atgaaaaggc cagcaatttc aagttaactc caaaaagtat cactcactac    240
caaacaaaag gtttaaaagg aaatgaccct caaacaggca tgcccccggg aataccaagg    300
ggcgcaatgg gcgttcaaaa attcaatgat tcacggaatt ctgcaattca cattacgtat    360
cgcatttccc tgcgttcttc acgatgcgaa aaccaaaaaa tccgttgttg aaagtttta    420
atatttaaaa atttccagtt acaaaaattc ttgttttga caaaaattta atgaataaat    480
aaaattgttt gtgtttgtta acctctggcc ccgattgctc gaatgcccaa agaaaaagtt   540
gcaaagatat gaaaactcca cagtgtgttg tattgaaacg gttttaattg tcctataaca   600
aaagcacaga aatctctcac cgtttggaat agcaaaaaga aacttacaag cctagcaaga   660
ccgcgcactt aagcgcaggc ccggctggac tctccatctc ttgtcttctt gcccagtaaa   720
agctctcatg ctccttgccaa aacaaaaaaa aaaaatccc atttacaaaa ttattaaatt   780
tctttaatga tccctccgga gttcaccacc agcaggagga ggg                      823

SEQ ID NO: 3             moltype = DNA   length = 816
FEATURE                  Location/Qualifiers
source                   1..816
                         mol_type = genomic DNA
                         note = Y02
                         organism = Saccharomyces cerevisiae
SEQUENCE: 3
tcacttatcg tctatttgag gtcaacttta ggaacattgt tcgcctagac gctctcttct   60
tatcgataac gttccaatac gctcagtata aaaagatta gccgcagttg gtaaaaccta   120
aaacgacgta cttgcattat acctcaagca cgcagagaaa cctctctttg gaaaaaaaaa   180
acatccaatg aaaaggccag caatttcaag ttaactccaa aagtatcac tccctaccaa    240
acaaaaggtt tgaaaggaaa tgacgctcaa acaggcatgc cccctgaat accaaggggc    300
gcaatgggcg ttcaaagatt caatgattca cggaattctg caattcacat tacgtatcgc   360
atttcgctgc gttcttcatc gtgcgaaaac caaaaaatcc gttgttgaaa gttttaata    420
ttttaaaatt tccagttaca aaaattcttg ttttgacaa aatttaatg aataaataaa     480
attgtttggg tttgttaacc tctgggcccg attgctcgaa tgcccaaaga aaaagttgca   540
aagatatgaa aactccacag tgtgttgtat tgaaacggtt ttaattgtcc tataacaaaa   600
gcacagaaat ctctcaccgt ttggaataga agaagaaac ttacaagcct agcaagaccg    660
cgcacttaag cgcaggcccg gctggactct ccatctcttg tcttcttgcc cagtaaaagc   720
tctcatgctc ttgccaaaac aaaaaaaaaa aacccatttt caaattata aaatttctta    780
aaggatccct ccgcgggtcc acccagcgag aaggg                               816

SEQ ID NO: 4             moltype = DNA   length = 745
FEATURE                  Location/Qualifiers
source                   1..745
                         mol_type = genomic DNA
                         note = Y12
                         organism = Saccharomyces cerevisiae
SEQUENCE: 4
cggggggttt ctacctgatt tgaggtcaac tttaagaaca ttgttcgcct agacgctctc    60
ttcttatcga taacgttcca atacgctcag tataaaaaag attagccgca gttggtaaaa   120
cctaaaagac cgtacttgca ttatacctca agcacgcaga gaaacctctc tttggaaaaa   180
aaaaacatcc aatgaaaagg ccagcaattt caagttaact ccaaaagta tcactcacta   240
ccaaacaaaa ggttgaaaag gaaatgaccc tcaaacaggc atgccccgg gaataccaag    300
gggcgcaagg ggcgttcaaa gattcaatga ttcacggaat tctgcaattc acattacgta   360
tcgcatttcg ctgcgttctt ctcgatgcaa aaccaaaaa atccgttgtt gaagtttttt    420
aaatttttaa aatttccagt tacaaaaatt cttgttttg acaaaaattt aatgaataaa   480
taaaattgtt tgtgtttgtt aacctctggc ccgattgctc gagtgccaag aaagttgcaa   540
gataacaac tcacagtgtg tgtatgaacg ttttattgtc tatacaagca cagaatctc    600
cacgttggat agcagagact acagctagca gacgccacta gcgcagccg ctgactctcc    660
atcctgctct gccagtaagc tctcatgcct gccaacaaac aaatcattca gtacatgct    720
catgatctcc agtcacacag agagg                                          745

SEQ ID NO: 5             moltype = DNA   length = 823
```

```
FEATURE             Location/Qualifiers
source              1..823
                    mol_type = genomic DNA
                    note = Y17
                    organism = Saccharomyces cerevisiae
SEQUENCE: 5
agcgtggtaa tacatacgtg atttgaggtc aactttaaga acattgttcg cctagacgct   60
ctcttcttat cgataacgtt ccaatacgct cagtataaaa aagattagcc gcagttggta  120
aaacctaaac gaccgtactt gcattatacc tcaagcacgc agagaaacct ctctttggaa  180
aaaaaaaaca tccaatgaaa aggccagcaa tttcaagtta actccaaaaa gtatcactca  240
ctaccaaaca aaagtttgaa aaggaaatga cgctcaaaca ggcatgcccc ctggaatacc  300
aaggggcgca atgtgcgttc aaaaattcaa tgattcacgg aattctgcaa ttcacattac  360
gtatcgcatt tcgctgcgtt ctcatcgatg cgaaaaccaa aaaatccgtt gttgaaagtt  420
tttaatattt taaaatttcc agttacaaaa attcttgttt ttgacaaaaa tttaatgaat  480
aaataaaatt gtttgtgttt gttaaccttg ggccccgatt gctcgaatgc ccaaagaaaa  540
agttgcaaag atatgaaaac tccacagtgt gttgtattga aacggtttta attgtcctat  600
aacaaaagca cagaaatctc tcaccgtttg gaatacaaga aagaaactta caagcctagc  660
aagaccgcgc acttaagcgc ggcccggctg gactctccat ctcttgtctt cttgcccagt  720
aaaagctctc atgctcttgc caaaacaaaa aaaaaaaaat cctttacaaa attattaaat  780
tcctttaatg atccctccgc aggcccccac tagcagcaga gag                    823
```

METHOD FOR REGULATING BLOOD GLUCOSE, LOSING WEIGHT, AND REDUCING PRODUCTION OF ADVANCED GLYCATION END PRODUCTS BY USING *SACCHAROMYCES CEREVISIAE* TCI907 OR SUPERNATANT THEREOF

CROSS-REFERENCE TO RELATED APPLICATION

This non-provisional application is a divisional of U.S. patent application Ser. No. 16/993,280, filed on Aug. 14, 2020, which claims the benefit of U.S. provisional application Ser. No. 62/886,397 filed on Aug. 14, 2019, the entire contents of which are hereby incorporated by reference.

REFERENCE OF AN ELECTRONIC SEQUENCE LISTING

The contents of the electronic sequence listing (P200419-2USI-D1.xml; Size: 10,555 bytes; and Date of Creation: Jan. 31, 2024) is herein incorporated by reference in its entirety.

BACKGROUND

Technical Field

The present disclosure relates to *Saccharomyces cerevisiae*, in particular to methods for regulating blood glucose, losing weight or reducing production of advanced glycation end products by using *Saccharomyces cerevisiae* TCI907 and/or metabolites thereof.

Related Art

The World Health Organization (WHO) recommends that the intake of sugar accounts for 10% or lower of the total calories, which is equivalent to 25 g or lower of the sugar intake per day.

A study has pointed out that in addition to increase of the probability of tooth decay, intake of excessive carbohydrates can also induce insulin resistance of people ingesting the carbohydrates, increase the probability of obesity, the probability of metabolic syndromes, and the probability of fatty liver development, raise the blood pressure, the blood glucose, and the blood lipid, and then increase the risk of a cardiovascular disease.

When the human body ingests sugar, the sugar and protein in the human body aggregate with each other and undergo an irreversible reaction to produce unreducible substances, namely advanced glycation end products (AGEs).

The advanced glycation end products will change and affect normal functions of the protein. For example, the advanced glycation end products will link with other proteins to form macromolecules, thereby reducing the chance of protein metabolism. In addition, the advanced glycation end products can also cause DNA translocation, which will cause DNA damage, and then affect normal functions of DNA. In addition, the advanced glycation end products, besides automatic generation in the human body, are rich in the daily diet. In addition to effect on the skin, the advanced glycation end products may affect whole organs of the human body by being absorbed by intestines.

Therefore, reducing the intake of the carbohydrates may lower harm to the body, for example, reducing the risk of chronic diseases.

SUMMARY

In some embodiments, *Saccharomyces cerevisiae* TCI907 is deposited at the German Collection of Microorganisms and Cell Cultures under an accession number of DSMZ33480.

In some embodiments, a composition includes *Saccharomyces cerevisiae* TCI907, metabolites of the *Saccharomyces cerevisiae* TCI907, or a combination thereof, wherein the *Saccharomyces cerevisiae* TCI907 is deposited at the German Collection of Microorganisms and Cell Cultures under an accession number of DSMZ33480.

In some embodiments, a use of *Saccharomyces cerevisiae* TCI907 and/or metabolites thereof in preparation of a composition for regulating blood glucose is provided, wherein the *Saccharomyces cerevisiae* TCI907 is deposited at the German Collection of Microorganisms and Cell Cultures under an accession number of DSMZ33480.

In some embodiments, a method for regulating blood glucose of a subject comprises administering to the subject a composition containing an effective amount of *Saccharomyces cerevisiae* TCI907 and/or metabolites thereof, wherein the *Saccharomyces cerevisiae* TCI907 is deposited at the German Collection of Microorganisms and Cell Cultures under an accession number of DSMZ33480.

In some embodiments, a use of *Saccharomyces cerevisiae* TCI907 and/or metabolites thereof in preparation of a composition for losing weight is provided, wherein the *Saccharomyces cerevisiae* TCI907 is deposited at the German Collection of Microorganisms and Cell Cultures under an accession number of DSMZ33480.

In some embodiments, a method for losing weight of a subject comprises administering to the subject a composition containing an effective amount of *Saccharomyces cerevisiae* TCI907 and/or metabolites thereof, wherein the *Saccharomyces cerevisiae* TCI907 is deposited at the German Collection of Microorganisms and Cell Cultures under an accession number of DSMZ33480.

In some embodiments, a use of *Saccharomyces cerevisiae* TCI907 and/or metabolites thereof in preparation of a composition for reducing production of advanced glycation end products is provided, wherein the *Saccharomyces cerevisiae* TCI907 is deposited at the German Collection of Microorganisms and Cell Cultures under an accession number of DSMZ33480.

In some embodiments, a method for reducing production of advanced glycation end products in a subject comprises administering to the subject a composition containing an effective amount of *Saccharomyces cerevisiae* TCI907 and/or metabolites thereof, wherein the *Saccharomyces cerevisiae* TCI907 is deposited at the German Collection of Microorganisms and Cell Cultures under an accession number of DSMZ33480

In conclusion, the *Saccharomyces cerevisiae* TCI907 and/or the metabolite thereof of any embodiment can be used for regulating blood glucose, losing weight or reducing production of advanced glycation end products. In addition, the *Saccharomyces cerevisiae* TCI907 is deposited at the German Collection of Microorganisms and Cell Cultures under the accession number of DSMZ33480. In some embodiments, the composition includes the *Saccharomyces cerevisiae* TCI907, the metabolite thereof, or the combination thereof. In some embodiments, the *Saccharomyces cerevisiae* TCI907 and/or the metabolite thereof can be used for preparing the compositions used for regulating the blood glucose, losing weight or reducing the production of the advanced glycation end products. In addition, the *Saccha-*

*romyces cerevisiae* TCI907 and/or the metabolite thereof inhibit/inhibits amylase activity to achieve the effect of regulating blood glucose The *Saccharomyces cerevisiae* TCI907 depletes carbohydrates to achieve the effect of regulating blood glucose and losing weight. In some embodiments, the *Saccharomyces cerevisiae* TCI907 improves a basic metabolic capacity of the subject to achieve the effect of losing weight and reduces production of advanced glycation end products in the subject.

DETAILED DESCRIPTION

Figure 1:
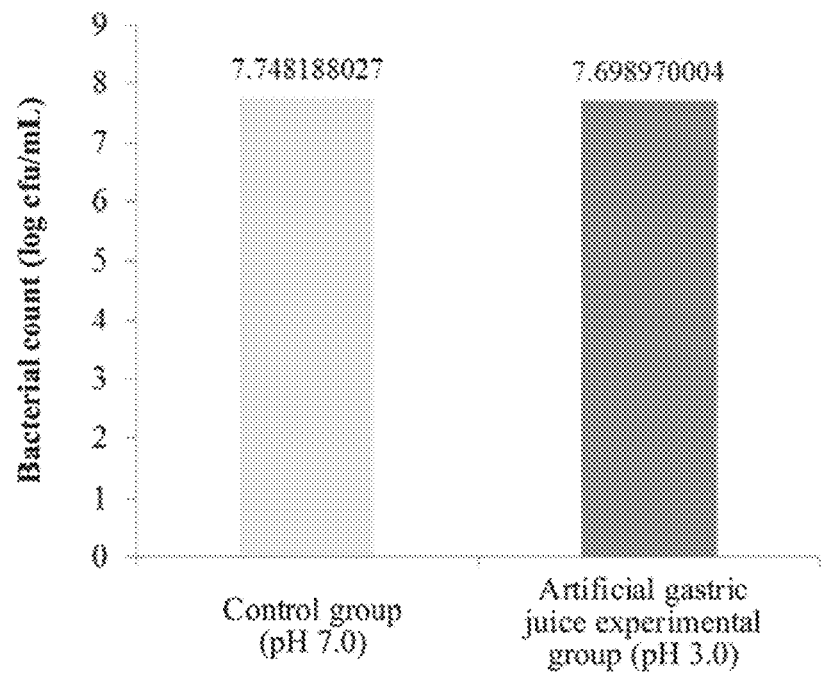
FIG. 1 is a bar chart showing the result of a viability experiment of *Saccharomyces cerevisiae* TCI907 in a simulated gastric environment.

*Saccharomyces cerevisiae* TCI907 is a bacterial strain of *Saccharomyces cerevisiae* separated from draft beer. The *Saccharomyces cerevisiae* TCI907 is deposited at the German Collection of Microorganisms and Cell Cultures under an accession number of DSMZ33480. In addition, the *Saccharomyces cerevisiae* TCI907 has a good capacity for depleting carbohydrates. In addition, when a host intakes the *Saccharomyces cerevisiae* TCI907, the *Saccharomyces cerevisiae* TCI907 has the capacity for competing with the host for the carbohydrates, thereby regulating blood glucose of the host.

It should be noted that "depleting carbohydrates" refers to its own capacity for "depleting monosaccharides" of the *Saccharomyces cerevisiae* TCI907, and also refers to the capacity for "competing for the monosaccharides" of the *Saccharomyces cerevisiae* TCI907 with the host.

The *Saccharomyces cerevisiae* TCI907 is an aerobic yeast in an ovoid shape. A colony of the *Saccharomyces cerevisiae* TCI907 is in an opaque milky white shape, and the colony thereof is smooth in surface and neat in edge. A growth temperature of the *Saccharomyces cerevisiae* TCI907 is 28° C. to 37° C. In addition, the *Saccharomyces cerevisiae* TCI907 can survive in an environment with a potential of hydrogen value (a pH value) of 3 to 7.

In some embodiments, the *Saccharomyces cerevisiae* TCI907 has a function of being resistant to gastric acid bile salts. For example, a survival rate of the *Saccharomyces cerevisiae* TCI907 in a simulated gastric environment (with the pH value of 3-4) is 99.4%, and the survival rate in a simulated intestinal environment (with the pH value of 7) is 99.8%.

Therefore, the *Saccharomyces cerevisiae* TCI907 can be colonized in the human gastrointestinal environment, through which, the *Saccharomyces cerevisiae* TCI907 then competes with the host for ingested carbohydrates so as to reduce the capacity for absorbing the carbohydrates of the host and assisting the human body in depleting the absorbed carbohydrates (such as glucose). In addition, the *Saccharomyces cerevisiae* TCI907 has the capacity for reducing production of advanced glycation end products. For example, when the capacity for absorbing the carbohydrates of the host is reduced, production of the advanced glycation end products in the host can be reduced.

In some embodiments, the *Saccharomyces cerevisiae* TCI907 is cultured, and after the *Saccharomyces cerevisiae* TCI907 bacterial cells and a supernatant are centrifugally separated, the supernatant is filtered to obtain the metabolite of the *Saccharomyces cerevisiae* TCI907. In other words, the metabolite of the *Saccharomyces cerevisiae* TCI907 includes a substance secreted into a culture medium by the *Saccharomyces cerevisiae* TCI907 after metabolism. In some embodiments, the metabolite of the *Saccharomyces cerevisiae* TCI907 further includes a yeast culture medium for culturing the *Saccharomyces cerevisiae* TCI907, and the yeast culture medium has cultured the *Saccharomyces cerevisiae* TCI907, but the yeast culture medium does not contain *Saccharomyces cerevisiae* TCI907 bacterial cells. In an exemplary example, the *Saccharomyces cerevisiae* TCI907 is used in a yeast extract peptone dextrose medium (YPD medium) at 28° C. for 16 hours to obtain a bacterial solution containing the *Saccharomyces cerevisiae* TCI907 bacterial cells and metabolites thereof. Next, the bacterial solution is centrifuged at 5000 rpm for 15 minutes to separate the *Saccharomyces cerevisiae* TCI907 bacterial cells from a supernatant containing the metabolite of the *Saccharomyces cerevisiae* TCI907. The supernatant is taken and filtered with a filter of 0.22 micron (μm) to obtain the metabolite of the *Saccharomyces cerevisiae* TCI907.

Herein, the term "metabolite" means a substance secreted into a culture medium by a yeast after metabolism, or a substance secreted into a culture medium by a yeast after metabolism and the yeast culture medium used for culturing the yeast when the yeast is cultured, but not containing the yeast itself.

In some embodiments, the *Saccharomyces cerevisiae* TCI907 and/or the metabolite of the *Saccharomyces cerevisiae* TCI907 have/has a function of inhibiting an activity of amylase. For example, when the host intakes the *Saccharomyces cerevisiae* TCI907 and/or the metabolite of the *Saccharomyces cerevisiae* TCI907, the amylase in the host can be inhibited, the conversion efficiency of starch ingested by the host into carbohydrates in the body can be reduced, thereby achieving the effect of blood glucose reduction.

In some embodiments, the *Saccharomyces cerevisiae* TCI907 and/or the metabolite of the *Saccharomyces cerevisiae* TCI907 have/has a function of consuming the carbohydrates. For example, the *Saccharomyces cerevisiae* TCI907 colonized in the body of the host can compete with the host for the carbohydrates and assist the host in depleting the carbohydrates (such as glucose).

In some embodiments, the *Saccharomyces cerevisiae* TCI907 and/or the metabolite of the *Saccharomyces cerevisiae* TCI907 have/has a function of reducing fat accumulation. For example, the metabolite of the *Saccharomyces* cerevisiae TCI907 can reduce the content of lipid droplets in adipocytes, thereby reducing fat accumulation.

In some embodiments, the *Saccharomyces cerevisiae* TCI907 has a function of reducing production of advanced glycation end products in a host, thereby reducing an oxidation stress caused by the advanced glycation end products. In some embodiments, a metabolite of the *Saccharomyces cerevisiae* TCI907 can be used for reducing the damage caused by advanced glycation end products to cells.

In some embodiments, the *Saccharomyces cerevisiae* TCI907 has a function of improving basic metabolic capacity of a host. In some embodiments, a metabolite of the *Saccharomyces cerevisiae* TCI907 can increase the content of pyruvate and increase the calorie consumption of muscle cells.

On such basis, the *Saccharomyces cerevisiae* TCI907 and/or the metabolite of the *Saccharomyces cerevisiae* TCI907 can be used for preparing a composite. In other words, the composite includes the *Saccharomyces cerevisiae* TCI907, the metabolite of the *Saccharomyces cerevisiae* TCI907 or a combination thereof.

In addition, in some embodiments, the *Saccharomyces cerevisiae* TCI907 and/or a metabolite thereof are/is used for preparing a composition for regulating blood glucose.

In some embodiments, the *Saccharomyces cerevisiae* TCI907 and/or a metabolite thereof are/is used for preparing a composition for losing weight.

In some embodiments, the *Saccharomyces cerevisiae* TCI907 and/or a metabolite thereof are/is used for preparing a composition for reducing production of advanced glycation end products.

In some embodiments, any of the foregoing compositions may be a medicine. In other words, the medicine contains an effective amount of the *Saccharomyces cerevisiae* TCI907 and/or the metabolite thereof.

In some embodiments, the foregoing medicine can be manufactured into a dosage form suitable for intestinal, parenteral, oral, or topical administration by using techniques well known to those skilled in the art.

In some embodiments, the dosage form for intestinal or oral administration may be, but is not limited to, a tablet, a troche, a lozenge, a pill, a capsule, dispersible powder or a granule, a solution, a suspension, an emulsion, syrup, an elixir, slurry or the like.

For example, when a dosage form of the composition is in a capsule dosage form, and the effective amount of the *Saccharomyces cerevisiae* TCI907 in the composition is $5 \times 10^7$ colony-forming unit/capsule (CFU/cap).

In some embodiments, any of the foregoing compositions may be an edible composition. In other words, the edible composition contains a certain content of the *Saccharomyces cerevisiae* TCI907 and/or the metabolite thereof. In some embodiments, the foregoing edible composition may be a food product or a food additive. In some embodiments, the food product may be, but is not limited to: beverages, fermented foods, health foods, and dietary supplements.

Example I: Strain Screening and Identification

Appropriate amount of liquid separately taken from draft beer and Korean unstrained liquor was put on a coating tray on solid YPD mediums (BD Difco™ YPD Broth with a model number DF0428-17-5), and was cultured at 28° C. until a single colony is formed. A plurality of single colonies were separately picked from the solid YPD culture tray of the draft beer coating tray and the solid YPD culture tray of the Korean unstrained liquor coating tray, and yeast internal transcribed spacer (ITS) genes were used for strain identification. ITS genes (namely SEQ ID NO: 1 to SEQ ID NO: 5) of these single colonies were obtained through a polymerase chain reaction (PCR), then, the National Center for Biotechnology Information (NCBI) website was utilized, and gene sequences shown by SEQ ID NO: 1 to SEQ ID NO: 5 were separately compared with ITS gene sequences of other subspecies of *Saccharomyces cerevisiae* (such as *Saccharomyces cerevisiae* YJM1383 (marked as YJM1383 in Table 1) and *Saccharomyces cerevisiae* YJM693 (marked as YJM693 in Table 1)). Similarities between the ITS gene sequences of these single colonies and other *Saccharomyces cerevisiae* subspecies are shown in Table 1. On such basis, these single colonies were bacterial strains of *Saccharomyces cerevisiae*, and are numbered and named according to Table 1.

TABLE 1

| Bacterial strain serial number | Separation source | ITS gene sequence serial number | Similarity | *Saccharomyces cerevisiae* subspecies (marked with subspecies serial numbers) |
|---|---|---|---|---|
| TCI907 | Draft beer | SEQ NO: 1 | 97%-98% | YJM1383, YJM693, 10-1358 |
| Y01 | Korean unstrained liquor | SEQ NO: 2 | 96% | bcpca-qj-6 |
| Y02 | Korean unstrained liquor | SEQ NO: 3 | 96% | M01614, TU74, K46A, bcpca-qj-6 |
| Y12 | Draft beer | SEQ NO: 4 | 92%-93% | TU121, CP1, TU14, TU9, YMA1 |
| Y17 | Draft beer | SEQ NO: 5 | 96%-97% | bcpca-qj-6, TU14 |

Among them, a single colony which was separated from draft beer and had a similarity up to 97% to 98% with other *Saccharomyces cerevisiae* subspecies was named the *Saccharomyces cerevisiae* TCI907. In addition, the *Saccharomyces cerevisiae* TCI907 was deposited at the German Collection of Microorganisms and Cell Cultures under an accession number of DSMZ33480.

Example II: A Gastric Acid Bile Salt Resistant Experiment

Herein, *Saccharomyces cerevisiae* TCI907 was tested with a buffer, an artificial gastric juice (pH 3) and an artificial intestinal juice (pH 7) to confirm acid alkali-resistance of the *Saccharomyces cerevisiae* TCI907 in a digestive tract of an organism. Among them, the buffer was potassium chloride (KCL with a model number Sigma-Aldrich P9333) of 0.2 molar concentration (M) and with a pH of 7. The artificial gastric juice was 0.2 M potassium chloride with a pH of 3. The artificial intestinal fluid was 0.2 M potassium chloride and 0.3 wt % of cow bile salts (purchased from Difco™ Oxgall, with a model number 212820) and a pH of 7.

An activation procedure was executed to activate the *Saccharomyces cerevisiae* TCI907. First, the *Saccharomyces cerevisiae* TCI907 frozen bacteria of 10 vol % were cultured in a liquid YPD medium (BD Difco™ YPD Broth, with a model number DF0428-17-5) at 28° C. for 16 hours to activate the *Saccharomyces cerevisiae* TCI907.

Next, an activated *Saccharomyces cerevisiae* TCI907 bacterial solution of a 1 vol % concentration was taken and was inoculated into 20 mL of a solution to be tested, and then cultured at 37° C. under shaking at 50 rpm for 3 hours. Among them, solutions to be tested of three groups were an artificial gastric juice (an experimental group), an artificial intestinal juice (an experimental group) and a potassium chloride buffer (a control group). 100 microliters (μL) of the bacterial solution was taken from the cultured bacterial solution to coat a tray, and was left to stand and cultured at 28° C. for 3 days, and then the number of viable bacteria in each group was counted with naked eyes 3 days later (calculate the number of colonies on the solid YPD medium).

Figure 2:
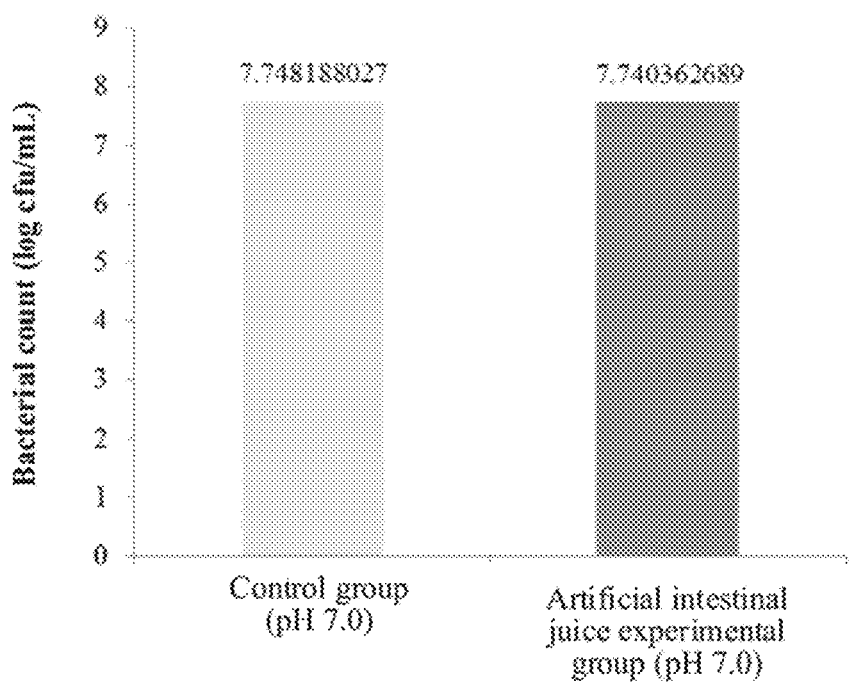
FIG. 2 is a bar chart showing the result of a viability experiment of *Saccharomyces cerevisiae* TCI907 in a simulated intestinal environment.

Refer to FIG. 1 and FIG. 2. In the diagram, viability of the *Saccharomyces cerevisiae* TCI907 is the counted number of viable bacteria, and is expressed in log CFU/mL. Among them, log CFU/mL indicates a colony-forming unit (CFU) contained in each milliliter of bacterial solution and is expressed in logarithm (log 10). It can be seen from FIG. 1 that the viability of the *Saccharomyces cerevisiae* TCI907 in the control group was 7.75 log CFU/mL, and the viability of the *Saccharomyces cerevisiae* TCI907 in the artificial gastric juice experimental group was 7.70 log CFU/mL. It can be seen from this that the number of viable bacteria in the artificial gastric juice experimental group was 99.4% of that of the control group. It can be seen from FIG. 2 that the viability of the *Saccharomyces cerevisiae* TCI907 in the control group was 7.75 log CFU/mL, and the viability of the *Saccharomyces cerevisiae* TCI907 in the artificial intestinal juice experimental group was 7.74 log CFU/mL. It can be seen from this that the number of viable bacteria in the artificial intestinal juice experimental group was 99.8% of that of the control group.

Therefore, the *Saccharomyces cerevisiae* TCI907 was demonstrated to be resistant to gastric acid bile salts.

Example III: A Carbohydrate Depleting Experiment

*Saccharomyces cerevisiae* TCI907, *Saccharomyces cerevisiae* Y01, *Saccharomyces cerevisiae* Y02, *Saccharomyces cerevisiae* Y12, and *Saccharomyces cerevisiae* Y17 were separately activated by a foregoing activation procedure to facilitate subsequent experiments.

A carbohydrate content of a YPD culture medium was adjusted with glucose (Sigma-Aldrich, with a model number G8270) into 20 g of glucose per each liter of YPD culture medium (namely a concentration of the glucose was 20 grams/liter (g/L)) to form an adjusted YPD culture medium. Next, the bacterial number of activated *Saccharomyces cerevisiae* TCI907, the bacterial number of activated *Saccharomyces cerevisiae* Y01, the bacterial number of activated *Saccharomyces cerevisiae* Y02, the bacterial number of activated *Saccharomyces cerevisiae* Y12, and the bacterial number of activated *Saccharomyces cerevisiae* Y17 were adjusted so that an absorbance value (OD600) thereof was 1. Next, 1 vol % of each *Saccharomyces cerevisiae* bacterial strain subjected to bacterial number adjustment was inoculated into the adjusted YPD culture medium and cultured at 28° C. for 18 hours to form a cultured bacterial solution of each *Saccharomyces cerevisiae* bacterial strain. Each cultured bacterial solution was centrifuged at 5000 rpm for 15 minutes, a supernatant obtained after centrifugation was diluted by 10 times, and a glucose concentration was measured with a blood glucose meter (a Rightest blood glucose meter, with a model number GM550). For the control group, a glucose concentration of an adjusted YPD culture medium subjected to dilution by 10 times was measured with a blood glucose meter (a Rightest blood glucose meter, with a model number GM550).

Figure 3:
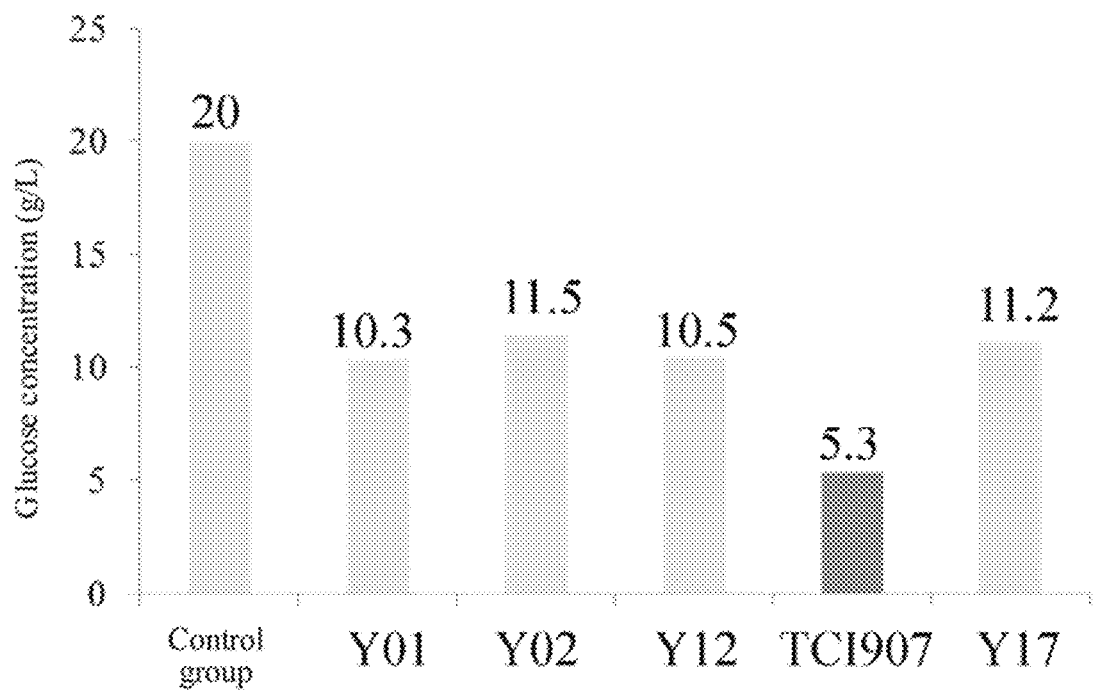
FIG. 3 is a bar chart showing the result of a carbohydrates depletion capacity experiment of *Saccharomyces cerevisiae* TCI907 and other *Saccharomyces cerevisiae* strains.

Refer to FIG. 3. The *Saccharomyces cerevisiae* bacterial strains were separately shown with serial numbers TCI907, Y01, Y02, Y12, and Y17 thereof in FIG. 3.

A glucose concentration of the control group (glucose thereof was not consumed or depleted by *Saccharomyces cerevisiae*) was 20 g/L. A measured glucose concentration of a supernatant of a *Saccharomyces cerevisiae* TCI907 group was 5.3 g/L. A measured glucose concentration of a supernatant of a *Saccharomyces cerevisiae* Y01 group was 10.3 g/L. A measured glucose concentration of a supernatant of a *Saccharomyces cerevisiae* Y02 group was 11.5 g/L. A measured glucose concentration of a supernatant of a *Saccharomyces cerevisiae* Y12 group was 10.5 g/L. A measured glucose concentration of a supernatant of a *Saccharomyces cerevisiae* Y17 group was 11.2 g/L. In other words, the measured glucose concentration of the supernatant of the *Saccharomyces cerevisiae* TCI907 group was lowest, that is to say, the *Saccharomyces cerevisiae* TCI907 had a carbohydrates depletion rate of 73.5%, and had better carbohydrates depletion capacity than other *Saccharomyces cerevisiae* bacterial strains.

It can be seen from this that the *Saccharomyces cerevisiae* TCI907 has a capacity for depleting glucose. After a host intakes the *Saccharomyces cerevisiae* TCI907, the *Saccharomyces cerevisiae* TCI907 colonized in the body of the host assists the host in depleting glucose.

Example IV: Preparation of Metabolites of *Saccharomyces cerevisiae* TCI907

After the *Saccharomyces cerevisiae* TCI907 was activated with the foregoing activation procedure, 10 vol % of the activated *Saccharomyces cerevisiae* TCI907 was inoculated into a YPD medium and cultured at 28° C. for 16 hours. Next, centrifugation was performed at 5000 rpm for 15 minutes to separate the *Saccharomyces cerevisiae* TCI907 bacterial cells from a supernatant containing the metabolite of the *Saccharomyces cerevisiae* TCI907. The supernatant was taken and filtered with a filter of 0.22 micron (μm) to obtain the metabolite of the *Saccharomyces cerevisiae* TCI907.

It can be seen from this that the metabolite of the *Saccharomyces cerevisiae* TCI907 was a substance secreted into a culture medium by the *Saccharomyces cerevisiae* TCI907 after metabolism and the YPD medium used for culturing the *Saccharomyces cerevisiae* TCI907 (but not containing the bacterial cells).

Example V: An Amylase Inhibition Experiment

Herein, a solution used included a 0.02 mole concentration (M) sodium phosphate buffer (hereinafter referred to as a NaCl-Pi buffer) containing 6 mM sodium chloride, a 1% starch solution, a dinitrosalicylic acid color reagent (hereinafter referred to as a terminating agent) and an α-amylase solution (5 units/mL). Among them, the NaCl-Pi buffer was prepared from sodium monohydrogen phosphate (purchased from J. T. Baker, with a serial number 3828-01), sodium dihydrogen phosphate (purchased from Sigma, with a serial number 04270), sodium chloride (purchased from First Chemical Works, with a serial number C4B07) and water. The 1% starch solution was obtained by dissolving soluble starch (purchased from Sigma, with a model number S9765) in the NaCl-Pi buffer. The terminating agent was prepared with 3,5-dinitrosalicylic acid (Sigma, with a model number D0550), 2 normality (N) of sodium hydroxide (NaOH, purchased from Macron, with a serial number 7708-10)

solution and deionized water. The α-amylase solution was prepared with α-amylase (purchased from Sigma, with a model number A3176) and the NaCl-Pi buffer to obtain 5 units/milliliter of α-amylase solution.

Herein, the metabolite of *Saccharomyces cerevisiae* TCI907 (prepared in Example IV) and the NaCl-Pi buffer were used as test samples, and an amylase enzyme activity test was performed according to Table 2 below.

TABLE 2

| Test group | Test sample | Reaction enzyme | Reaction matrix |
|---|---|---|---|
| Experimental group (0 minute) | Metabolite of the *Saccharomyces cerevisiae* TCI907 | α-amylase | Starch |
| Experimental group (10 minutes) | Metabolite of the *Saccharomyces cerevisiae* TCI907 | α-amylase | Starch |
| Control group (0 minute) | NaCl-Pi buffer | α-amylase | Starch |
| Control group (10 minutes) | NaCl-Pi buffer | α-amylase | Starch |

Among them, the experimental group (0 minute) and the control group (0 minute) were test groups at a starting point of reaction (0 minute), which indicated that α-amylase does not react with the starch. However, the experimental group (10 minutes) and the control group (10 minutes) were test groups at a termination point of reaction (10 minutes), which indicated that α-amylase reacts with the starch for 10 minutes. In addition, each test group was subjected to three repeated experiments.

According to Table 2, 200 μL of the test sample was separately taken into centrifuge tubes, then 200 μL of α-amylase solution (5 units/mL) was separately added into each centrifuge tube, the centrifuge tube containing the test sample and the α-amylase solution was shaken to uniformly mix the test sample and the α-amylase solution to form a solution to be reacted, and the centrifuge tube containing the solution to be reacted was placed in an environment of 25° C. for reaction for 10 minutes.

Next, 400 μL of terminating agent was separately added to the centrifuge tubes of the test groups at the starting point of the reaction (0 minute) to be uniformly mixed with a solution to be reacted, and then 200 μL of 1% starch solution was separately added and left to stand at 25° C. for 10 minutes to form an unreacted solution.

However, 200 μL of 1% starch solution was separately added into the centrifuge tubes of the test groups at the termination point of the reaction (10 minutes) to uniformly mix the 1% starch solution and the solution to be reacted to form a mixed solution. A centrifuge tube containing the mixed solution was placed for reaction at 25° C. for 10 minutes, and then 400 μL of terminating agent was added and uniformly mixed with the reaction solution to stop reaction of starch and α-amylase to form a reaction solution.

Then, a centrifuge tube containing the unreacted solution and a centrifuge tube containing the reacted solution were placed in boiling water (100° C.) for 5 minutes, and then were cooled to a room temperature (25° C.) to form a solution to be tested.

150 μL of the solution to be tested was separately taken from the centrifuge tubes and was mixed with 850 μL of water to dilute the solution to be tested. Next, 200 μL of diluted solution to be tested was taken and put into a 96-well tray, and an ELISA (an enzyme-linked immunosorbent assay) reader (brand: BioTek) was used for measuring an absorbance value thereof at 540 nm.

The activity percentage (%) of the amylase of each test group relative to the control group was calculated according to the following formula (1). In other words, the activity percentage of the amylase in the control group was regarded as 100% for calculating the activity percentage (%) of the amylase between the experimental group and the reference group.

Formula (1)

$$\% \, \alpha-\text{Amylase activity} = \frac{A_{540 \, nm}(\text{Sample}_{10 \, min} - \text{Sample}_{0 \, min})}{A_{540 \, nm}(\text{Control}_{10 \, min} - \text{Control}_{0 \, min})} \times 100\% \quad (1)$$

Among them, % α-Amylase activity indicates the activity percentage of amylase (%). $A_{540 \, nm}$ ($\text{Sample}_{10 \, min}$–$\text{Sample}_{0 \, min}$) indicated the difference between an absorbance value of the test group at the termination point of the reaction (10 minutes) at 540 nm and an absorbance value of the test group at the starting point of the reaction (0 minute) at 540 nm, and this test group was an experimental group. $A_{540 \, nm}$ ($\text{Control}_{10 \, min}$–$\text{Control}_{0 \, min}$) indicated the difference between an absorbance value of the control group at the termination point of the reaction (10 minutes) at 540 nm and an absorbance value of the control group at the starting point of the reaction (0 minute) at 540 nm.

According to a measurement result of the experimental group, a value of $A_{540 \, nm}$ ($\text{Sample}_{10 \, min}$–$\text{Sample}_{0 \, min}$) was 0.482, and a value of $A_{540 \, nm}$ ($\text{Control}_{10 \, min}$–$\text{Control}_{0 \, min}$) was 0.563. Furthermore, according to the formula (1), the activity percentage of the amylase of the experimental group was 85.6%. In other words, when the activity percentage of the amylase of the control group was regarded as 100%, an inhibition percentage of amylase activity was 14.4%.

It could be seen from this that the metabolite of the *Saccharomyces cerevisiae* TCI907 inhibit amylase activity. Therefore, when the host intakes the *Saccharomyces cerevisiae* TCI907, the *Saccharomyces cerevisiae* TCI907 colonized in the host assisted the host in reducing the conversion efficiency of starch ingested by the host into carbohydrates in the body, thereby achieving the effect of blood glucose reduction of the host.

On such basis, the *Saccharomyces cerevisiae* TCI907 and/or the metabolite thereof can be used for preparing a composition for regulating the blood glucose.

Example VI: Cell Oxidation Degree Test

Herein, a fluorescent probe DCFH-DA (Sigma/SI-D6883-50 MG), cooperating with a flow cytometer (brand: BD Accuri), was used for measuring a change of human monocytes (THP1 cells; purchased from ATCC® TIB-202™) in the content of reactive oxygen species caused by advanced glycation end products.

In addition, a solution used included Roswell Park Memorial Institute 1640 (RPMI 1640) (hereinafter referred to as RPMI medium) added with 10 vol % of fetal bovine serum (FBS, purchased from Gibco), 1 vol % of antibiotic-antimycotic, a 10 mM zwitterionic sulfonic acid buffer (HEPES), 1 mM sodium pyruvate and 0.05 mM 2-mercaptoethanol, phosphate-buffered saline (PBS, purchased from Gibco), a DCFH-DA solution and the advanced glycation end products (AGEs). For the DCFH-DA solution, 2,7-dichloro-dihydro-fluorescein diacetate (DCFH-DA; with a product number SI-D6883-50 MG, purchased from Sigma)

was dissolved in dimethyl sulfoxide (DMSO; purchased from Sigma) to prepare a 5 mg/mL DCFH-DA solution. In addition, the advanced glycation end products were obtained through the steps that a 0.1 M phosphate buffer (pH 7.4), 3 mg/mL bovine skin collagen type I solution, a 2 M fructose solution and deionized water were mixed in a volume ratio of 5:2:2:1 and react at 60° C. for one week.

The cell oxidation degree test was performed through three groups of an experimental group (adding metabolites of the *Saccharomyces cerevisiae* TCI907 and adding the advanced glycation end products), a reference group (not adding the metabolite of the *Saccharomyces cerevisiae* TCI907, but adding the advanced glycation end products) and a control group (not adding the metabolite of the *Saccharomyces cerevisiae* TCI907 or the advanced glycation end products). Among them, the metabolite of the *Saccharomyces cerevisiae* TCI907 was prepared in Example IV.

First, the human monocytes were inoculated in a 6-well culture tray containing 2 mL of RPMI medium per well in a quantity of $2\times10^5$ per well, and were cultured at 37° C. for 24 hours. Next, the RPMI medium in which the human monocytes had been cultured was replaced, 2 mL of a test RPMI medium was added to each well, and culturing was performed at 37° C. for 24 hours. Among them, the test RPMI medium of the experimental group was an RPMI medium added with 0.25 vol % metabolite of the *Saccharomyces cerevisiae* TCI907 prepared in Example IV. The test RPMI mediums of the reference group and the control group were pure RPMI mediums.

The test RPMI medium was changed to a reaction medium, and culturing was performed at 37° C. for 24 hours. Among them, the reaction mediums of the experimental group and the reference group were RPMI mediums containing 160 μg/mL advanced glycation end products, and the reaction medium of the control group was a pure RPMI medium.

The DCFH-DA solution was added to the reaction medium at a ratio of 5 micrograms of DCFH-DA to the reaction medium of each milliliter, and culturing was performed at 37° C. for 30 minutes.

Next, the human monocytes of three groups were collected and obtained through centrifugation at a revolving speed of 400×g for 5 minutes. In addition, each group was subjected to the washing steps of 1 mL 1×PBS re-dissolution, centrifugation and supernatant removal for three times, and then the washed human monocytes were re-dissolved with 1 mL 1×PBS to form cell sap to be tested of the three groups.

Figure 4:
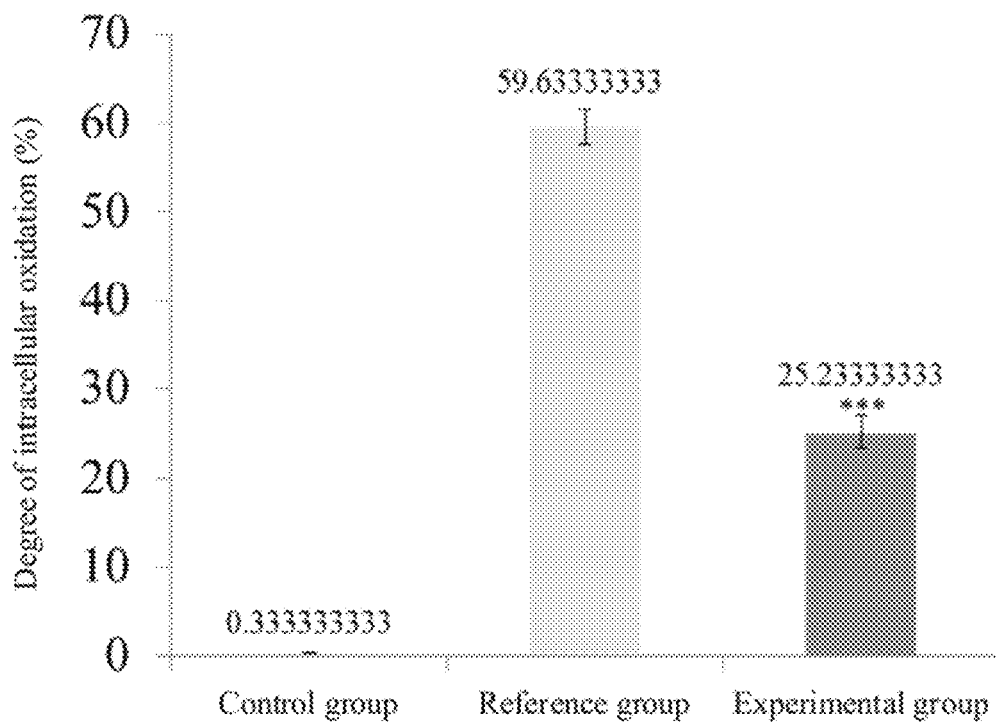
FIG. 4 is a bar chart showing the result of inhibiting intracellular oxidation by metabolites of *Saccharomyces cerevisiae* TCI907.

The flow cytometer (brand: BD Accuri) was used for detecting a fluorescence signal of DCFH-DA in the cell sap to be tested of the three groups. An excitation wavelength and an emission wavelength for fluorescence detection were 450 nanometers (nm) and 550 nm respectively. Since DCFH-DA, after entering cells, would be firstly hydrolyzed into dichlorodihydrofluorescein (DCFH), and then oxidized by reactive oxygen species generated by the advanced glycation end products into dichlorofluorescein (DCF) that could emit green fluorescence. The fluorescence intensity of DCFH-DA-treated cells reflect the content of the reactive oxygen species in the human monocytes, through which, the percentage of a degree of intracellular oxidation could be obtained, as shown in FIG. 4. It should be noted that the degree of intracellular oxidation in FIG. 4 was presented as a percentage, in which an STDEV formula of Excel software was used for calculating a standard deviation, and statistically significant differences among the groups were statistically analyzed through student t-test. In FIG. 4, "***" means that a p value thereof is less than 0.001.

Refer to FIG. 4. The degree of intracellular oxidation in the control group was 0.33%, which indicated that human monocytes without added advanced glycation end products were not affected by oxidative stress. The degree of intracellular oxidation in the reference group was 59.63%, which indicated that the advanced glycation end products exert oxidative stress on human monocytes. The degree of intracellular oxidation in the experimental group was 25.23%, which was lower than the degree of intracellular oxidation in the reference group by 34.4%, which indicated that the metabolite of the *Saccharomyces cerevisiae* TCI907 reduce the oxidative stress caused by the advanced glycation end products on the human monocytes. In other words, compared with the oxidation degree of the reference group, the oxidation degree of the experimental group was decreased by 58%. It could be seen from this that the *Saccharomyces cerevisiae* TCI907 and/or the metabolite thereof was used for reducing the damage caused by advanced glycation end products to the cells.

On such basis, the *Saccharomyces cerevisiae* TCI907 and/or metabolites thereof can be used for preparing a composition for reducing production of advanced glycation end products.

Example VII: Fat Accumulation Detection

Herein, a pre-adipocyte expansion medium used was a minimum essential medium α (MEM α, brand: Gibco) added with 20 vol % FBS (brand: Gibco) and 1 vol % penicillin-streptomycin. A differentiation medium used was MEM α (brand: Gibco) added with 20 vol % FBS (brand: Gibco) and 1 vol % penicillin-streptomycin. In addition, an oil-red O stain (brand: Sigma) was completely dissolved in 100% isopropanol (supplier: ECHO) to prepare a 3 mg/mL oil-red O stain stock solution. In order to obtain a usable oil-red O working solution, the oil-red O stain stock solution was diluted with secondary water (ddH2O) to a concentration of 1.8 mg/mL right before use, namely 60% oil-red O stain stock solution.

First, mouse bone marrow stromal cell strains OP9 (purchased from ATCCX, with a serial number CRL-2749™) were inoculated in wells of a 24-well culture tray containing 500 μL of pre-adipocyte expansion medium with the cell number of $8\times10^4$ cells per well, and were cultured at 37° C. for 7 days. In the 7-day culture period, the differentiation medium was replaced with fresh 500 μL differentiation medium every 3 days. In 7 days of culturing, a microscope (brand: ZEISS) was used for observing formation of lipid droplets in the cells in each well to confirm that the cells were fully differentiated into adipocytes for use by subsequent experiments.

In 7 days of culturing, the adipocytes were divided into 2 groups: an experimental group and a control group. The differentiation medium of each group was removed and replaced with 500 μL of experimental medium per well, and then placing at 37° C. was performed for continuous culturing for 7 days. In the 7-day culture period, the medium was replaced with fresh 500 μL of experimental medium every 3 days. Among them, the experimental medium of the experimental group was a differentiation medium containing 0.25 vol % metabolite of the *Saccharomyces cerevisiae* TCI907 obtained in Example IV. The experimental medium of the control group was a pure differentiation medium (namely without the metabolite of the *Saccharomyces cerevisiae* TCI907).

Next, the experimental medium in each well was removed, and rinsing twice with 1×PBS (Dulbecco's phosphate buffered saline; purchased from Gibco) was performed. Next, 1 mL of 10% formaldehyde (formaldehyde, supplier: ECHO) was added to each well, culturing at a room temperature was performed for 30 minutes to fix the cells. Then, the formaldehyde in each well was removed and each well was rinsed twice with 1 mL PBS. After re-rinsing was performed, 1 mL of 60% isopropanol was added to each well to act for 1 minute. Next, the isopropanol was removed, and 1 mL of oil-red O working solution was added and reacts for 1 hour at a room temperature. After acting for 1 hour, the oil-red O working solution was removed and quick destaining with 1 mL of 60% isopropanol was performed for 5 seconds. Next, 100% isopropanol was added to each well, placing on a shaker was performed for reaction for 10 minutes to dissolve the stain. Then, 100 µL of the foregoing dye-isopropanol solution was taken from each well to a 96-well culture tray and an absorbance value (OD510) of each well was read with an ELISA reader (brand: BioTek) at a wavelength of 510 nm.

Figure 5:
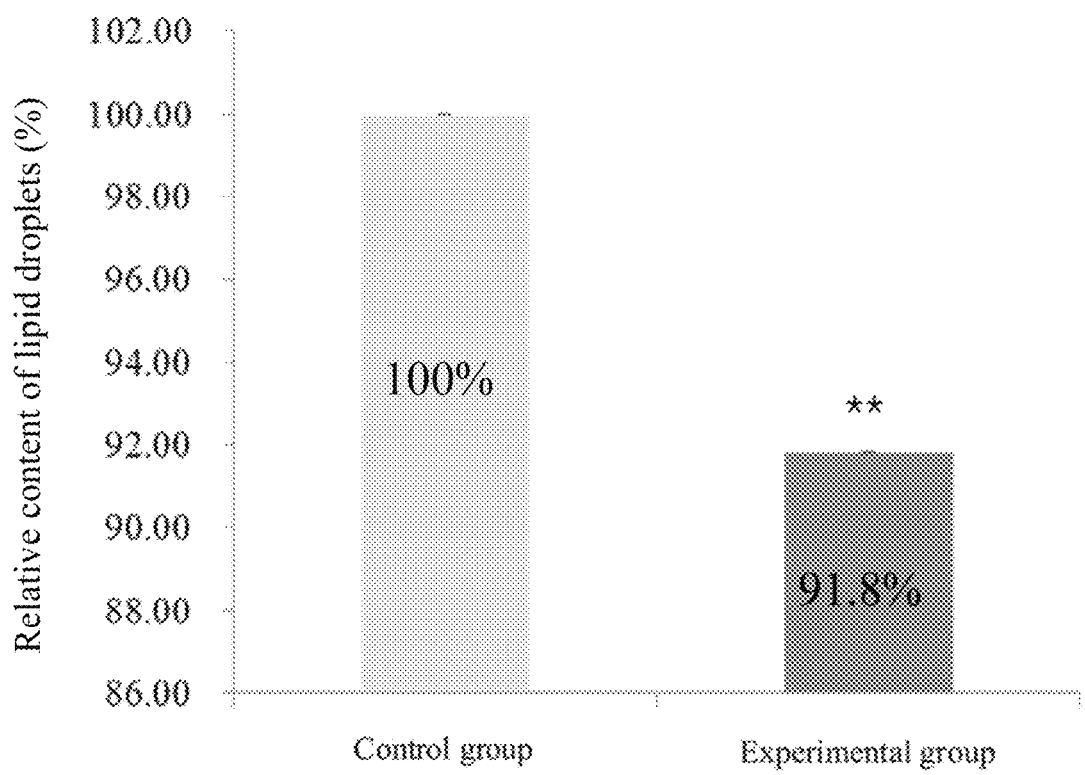
FIG. 5 is a bar chart showing the result of relative content of lipid droplets.

After measurement, a percentage of the lipid droplets (%) was calculated, as shown in FIG. 5. In other words, herein, a percentage of lipid droplets in the control group was regarded as 100% for calculating a percentage of lipid droplets in the experimental group. In addition, statistically significant differences between the experimental group and the control group were statistically analyzed through student t-test. In FIG. 5, "**" indicates that a p value thereof is less than 0.01 when compared with the control group.

Refer to FIG. 5. Compared with the control group, the percentage of lipid droplets in the experimental group was 91.8%, which could reduce the amount of lipid droplets by 8.2%. Herein, the percentage of lipid droplets in the experimental group was significantly lower than that in the control group. It could be seen from this that the *Saccharomyces cerevisiae* TCI907 and/or the metabolite thereof effectively inhibit fat accumulation, and have the function of reducing fat formation of a receptor, thereby achieving the effect of losing weight.

Therefore, the *Saccharomyces cerevisiae* TCI907 and/or the metabolites thereof can be used for preparing a composition for losing weight.

Example VIII: Pyruvate Content Detection

Herein, a pretreatment medium used was a DMEM medium (Dulbecco's Modified Eagle Medium) added with 3.7 g/L sodium bicarbonate, 10 vol % FBS (brand: Gibco) and 1 vol % penicillin-streptomycin. A treatment medium used was a DMEM medium containing 1 vol % FBS and 1 vol % horse serum.

First, mouse skeletal muscle cells (hereinafter referred to as C2C12 cells; purchased from ATCCR CRL-1772™) were inoculated in a 6-well tray with each well containing 2 mL of pretreatment medium with the cell number of $1\times10^5$ cells per well, and were cultured at 37° C. until the cells form a uniform monolayer at the bottom of each well of the culture tray (namely the cell confluence reaches 100%). Next, the medium was changed to the treatment medium to continue culturing the C2C12 cells until the C2C12 cells differentiate and fuse into polynuclear myotubes.

Next, the differentiated myotubes were divided into 2 groups: an experimental group and a control group. The treatment medium of each group was removed and replaced with 2 mL of a test medium per well, and then placing at 37° C. was performed for continuous culturing for 48 hours. Among them, the test medium of the experimental group was a treatment medium containing 0.25 vol % metabolite of the *Saccharomyces cerevisiae* TCI907 obtained in Example IV. The test medium of the control group was a pure treatment medium (namely without the metabolite of the *Saccharomyces cerevisiae* TCI907).

After culturing was performed for 48 hours, 100 µL of a pyruvate assay buffer of pyruvate colorimetric/fluorometric assay kit (purchased from BioVision) was taken and put into each well to lyse the cultured myotubes and form a cell solution. After the cell solution was centrifuged at 10000 g for 10 minutes at 4° C., a supernatant was collected. Next, in each group, 20 µL of supernatant was taken and put into a 96-well tray, and was adjusted to 50 µL volume each well with the pyruvate assay buffer. Next, 50 µL of a reaction mix was added to each well, and after mixing, reaction at a room temperature was performed for 30 minutes. Among them, each 50 µL of reaction mix included 46 µL of pyruvate assay buffer, 2 µL of pyruvate probe and 2 µL of enzyme mix.

In addition, for colorimetric measurement, a standard curve was formulated with a pyruvate standard (with a concentration of nmol/µL) of the pyruvate colorimetric/fluorometric assay kit. Then, 0 nmol/well, 2 nmol/well, 4 nmol/well, 6 nmol/well, 8 nmol/well and 10 nmol/well standard solutions of the pyruvate were prepared, and were adjusted to 50 µL volume each well with the pyruvate assay buffer. Then, 50 µL of reaction mix was added to each well and mixed uniformly for reaction for 30 minutes to obtain a standard reaction solution. Next, an absorbance value thereof was measured at 570 nm to obtain a standard curve.

Figure 6:
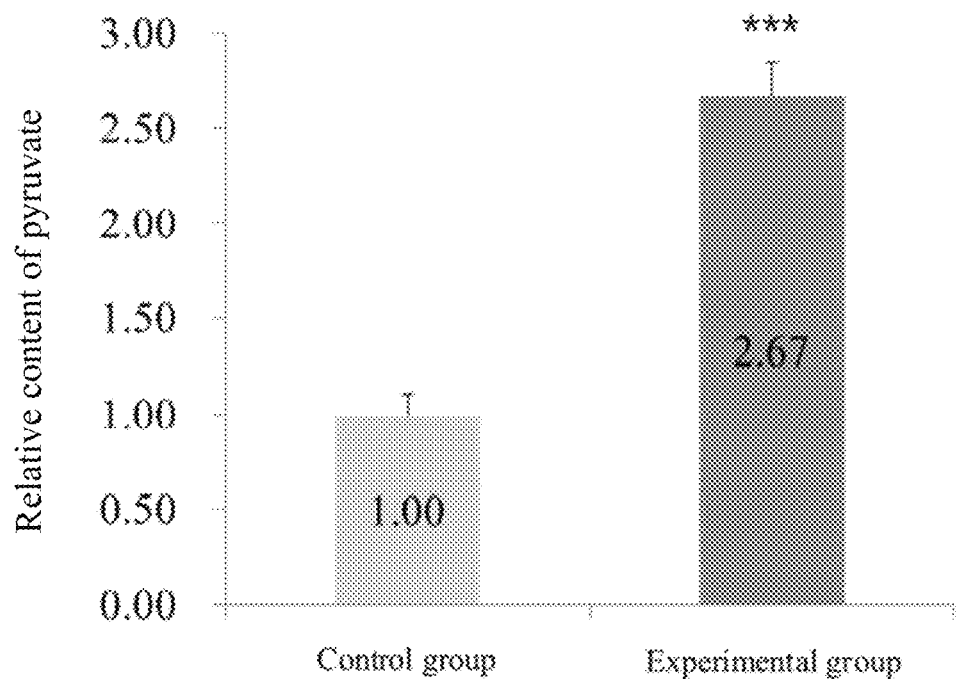
FIG. 6 is a bar chart showing the result of relative content of pyruvate.

In addition, the absorbance values of the experimental group and the reference group were measured at a wavelength of 570 nm, a pyruvate content of each group was calculated through linear interpolation using the standard curve, and then relative magnification of the pyruvate content of the control group and the experimental group was obtained, as shown in FIG. 6. It should be noted that the pyruvate content in FIG. 6 was presented as the relative magnification, in which an STDEV formula of Excel software was used for calculating a standard deviation, and statistically significant differences among the groups were statistically analyzed through student t-test. In FIG. 6, "***" means that a p value thereof is less than 0.001.

Refer to FIG. 6. When the relative content of pyruvate in the control group was regarded as 1 (namely the relative content of pyruvate in the control group was 100%), the relative content of pyruvate in the experimental group was 2.67 (namely the relative content of pyruvate in the experimental group was 267%). In other words, the pyruvate content in the experimental group was higher than that in the control group, which indicated that muscle cells (myotubes) in the experimental group consume 2.67 times more calories than those in the control group. The pyruvate was used as an indicator of basic metabolism. On such basis, the *Saccharomyces cerevisiae* TCI907 and/or metabolite thereof can effectively increase the basic metabolic rate of muscle cells of a host.

Example IX: A Human Body Experiment

To further confirm the effect of the *Saccharomyces cerevisiae* TCI907 on the human body, 8 subjects were asked to intake 1 viable yeast capsule of the *Saccharomyces cerevisiae* TCI907 (each capsule contains $5\times10^7$ CFU (namely $5\times10^7$ CFU/cap) of the *Saccharomyces cerevisiae* TCI907) 30 minutes before meals every day and for 4 weeks. Among them, the 8 subjects were with a body mass index (BMI)

greater than or equal to 24, or may be a group with high body fat (male body fat rate was greater than or equal to 25 wt %, female body fat rate was greater than or equal to 30 wt %). In addition, each capsule contains 50 mg of yeast powder of the *Saccharomyces cerevisiae* TCI907.

Figure 7:
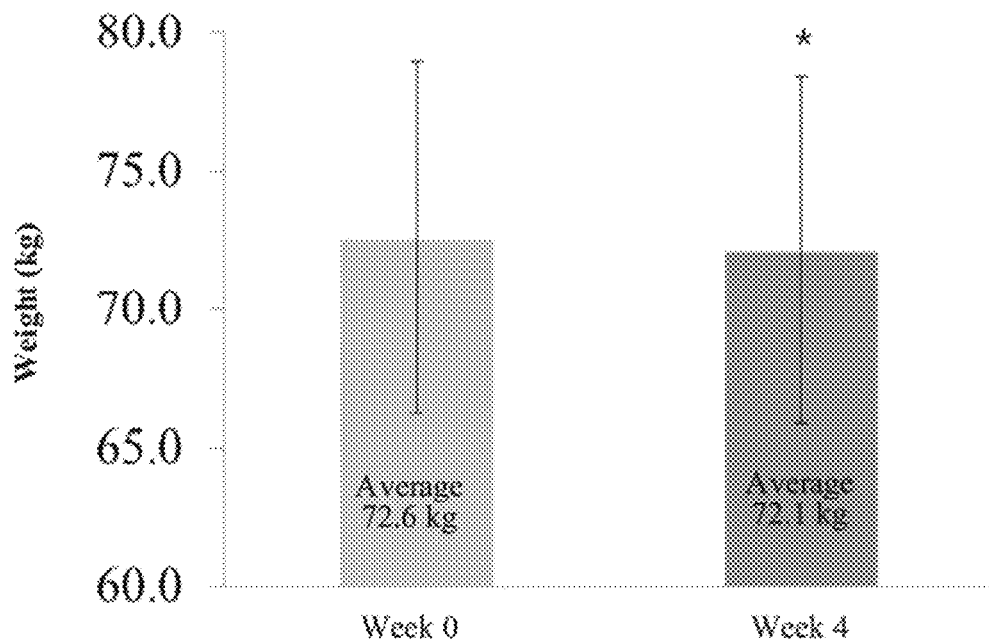
FIG. 7 is a bar chart showing the result of weight data of week 0 and week 4.
Figure 8:
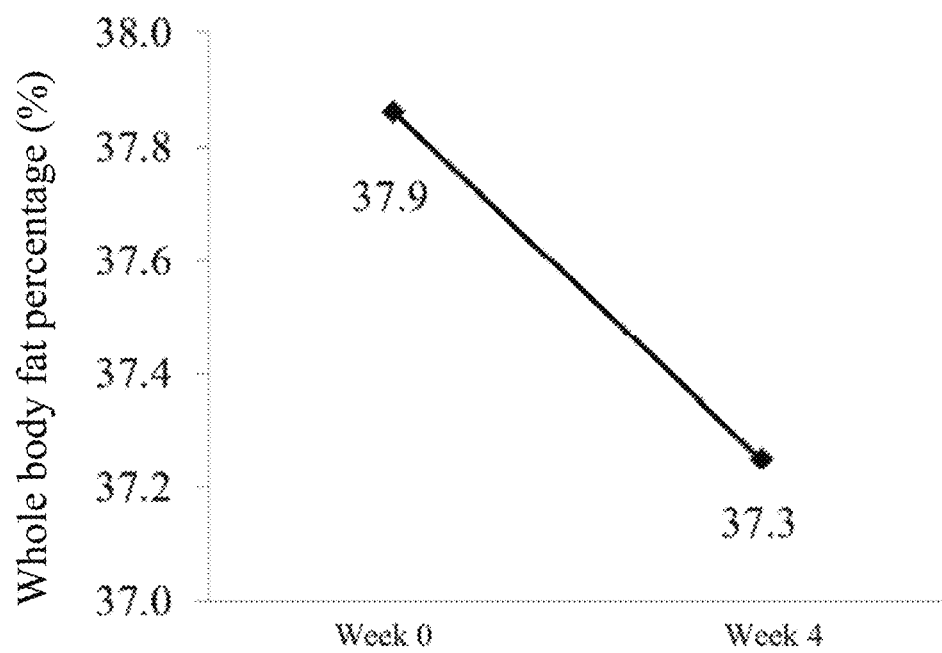
FIG. 8 is a line chart showing the result of whole body fat percentage data of week 0 and week 4.
Figure 9:
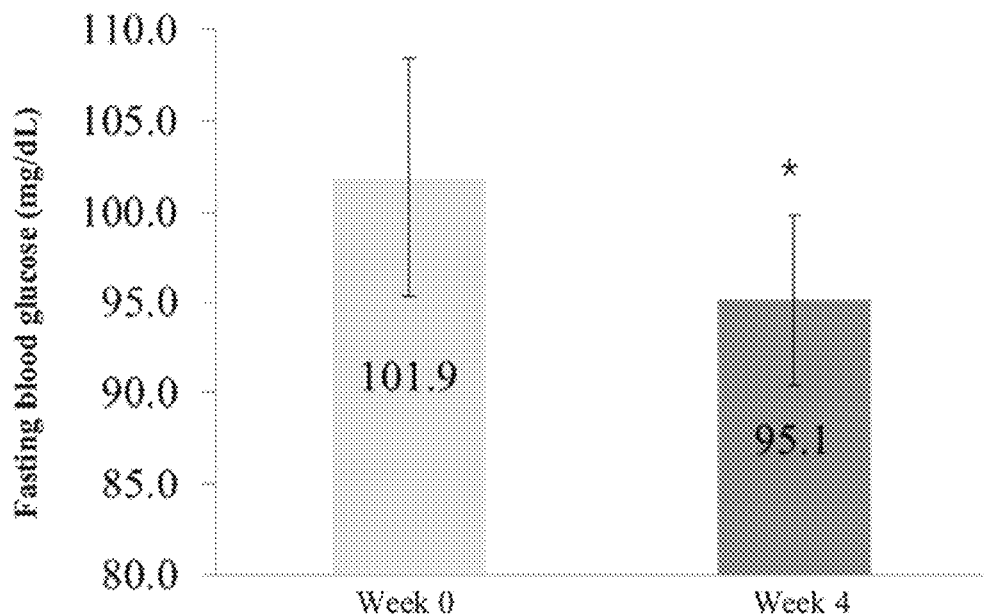
FIG. 9 is a bar chart showing the result of fasting blood glucose data of week 0 and week 4.

In addition, before the experiment (namely before taking the *Saccharomyces cerevisiae* TCI907 capsules, and regarded as week 0) and after the experiment (namely 4 weeks after the *Saccharomyces cerevisiae* TCI907 capsules were taken, and regarded as week 4), weight, a whole body fat rate, a fasting blood glucose level and a postprandial blood glucose level were measured. Among them, the weight and whole body fat rate were measured with a weight body fat meter (TANITA limb and trunk body composition meter BC601), as shown in FIG. 7 and FIG. 8. The fasting blood glucose level was determined in a way that before and after the experiment, the 8 subjects, after being on a fasting for 8 hours, were subjected to fingertip blood sampling through a blood collection tube, and the blood was sent to a laboratory (LEZEN Reference Lab) to determine the fasting blood glucose level, as shown in FIG. 9. The postprandial blood glucose level was determined in a way that before and after the experiment, 8 subjects intake 4 pieces of toast (fixed carbohydrate amount) after being subjected to fasting blood sampling, and were subjected to fingertip blood sampling through a blood collection tube at 30 minutes, 60 minutes and 120 minutes of toast taking, and the blood was sent to a laboratory to determine the postprandial blood glucose level, as shown in FIG. 10.

Figure 10:
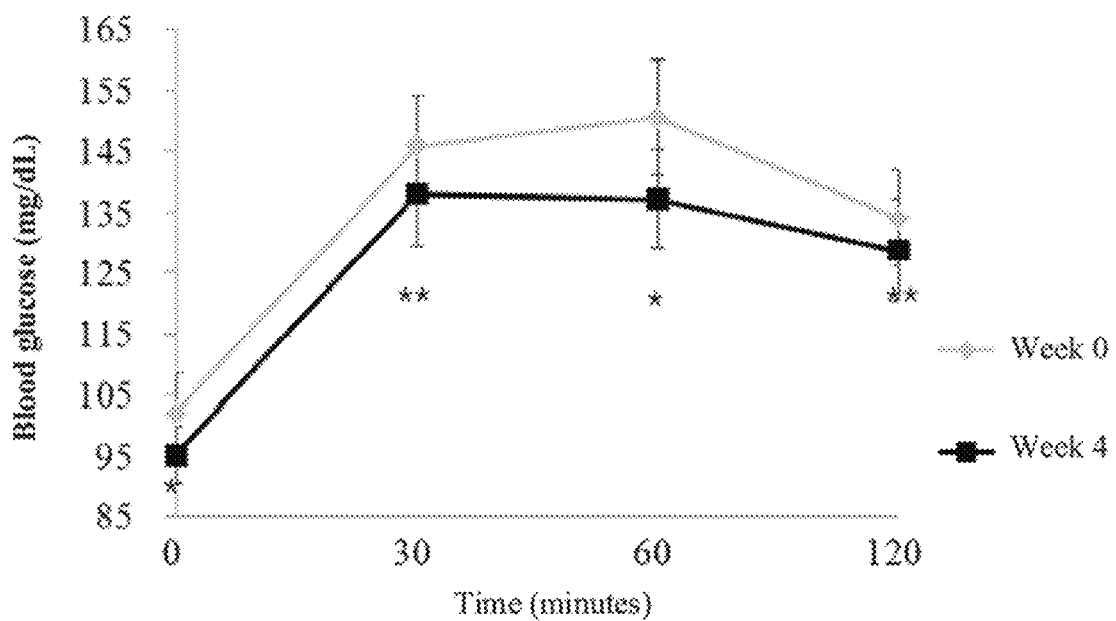
FIG. 10 is a line chart showing the result of postprandial blood glucose data of week 0 and week 4.

It should be noted that the statistical significant differences between measurement results in week 0 and in week 4 and between the time points after meals were statistically analyzed through student t-test, as shown in FIG. 7, FIG. 9 and FIG. 10. In FIG. 7, "*" indicates that a p value thereof is less than 0.05 when compared with week 0. In FIG. 9 and FIG. 10, "*" indicates that the p value is less than 0.05 when compared with week 0, and "**" indicates that the p value is less than 0.01 when compared with week 0.

Refer to FIG. 7. Before the experiment (namely week 0 in FIG. 7), an average weight of the 8 subjects was 72.6 kg, and after the experiment (namely week 4 in FIG. 7), an average weight of the 8 subjects was 72.1 kg. In other words, after taking the viable yeast capsule of the *Saccharomyces cerevisiae* TCI907 daily for 4 weeks, the average weight of the subjects was decreased by 0.5 kg. On such basis, the *Saccharomyces cerevisiae* TCI907 can reduce body weight.

Refer to FIG. 8. Before the experiment (namely week 0 in FIG. 8), an average body fat percentage of 8 subjects was 37.9%, and after the experiment (namely week 4 in FIG. 8), an average body fat percentage of 8 subjects was 37.3%. In other words, after taking the viable yeast capsules of the *Saccharomyces cerevisiae* TCI907 daily for 4 weeks, the average body fat percentage of the subjects was decreased by 0.6%. On such basis, the *Saccharomyces cerevisiae* TCI907 can reduce body fat percentage.

Therefore, the *Saccharomyces cerevisiae* TCI907 has a function of losing weight.

Refer to FIG. 9. Before the experiment (namely week 0 in FIG. 9), the average fasting blood glucose level of the 8 subjects was 101.9 mg/dL, and after the experiment (namely week 4 in FIG. 9), the average fasting blood glucose level of the 8 subjects was 95.1 mg/dL. In other words, after taking the viable yeast capsule of the *Saccharomyces cerevisiae* TCI907 daily for 4 weeks, the average fasting blood glucose level of the subjects was decreased by 6.8 mg/dL.

Refer to FIG. 10. Through comparison between before the experiment (namely a curve of week 0 in FIG. 10) and after the experiment (namely a curve of week 4 in FIG. 10), it can be seen that the average postprandial blood glucose level of 8 subjects was decreased after the subjects intake the viable yeast capsule of the *Saccharomyces cerevisiae* TCI907 daily for 4 weeks. In other words, the *Saccharomyces cerevisiae* TCI907 can improve postprandial blood glucose changes.

On such basis, the *Saccharomyces cerevisiae* TCI907 and/or metabolites thereof were demonstrated to regulate blood glucose.

In conclusion, the *Saccharomyces cerevisiae* TCI907 and/or the metabolites thereof according to any embodiment of the present disclosure can be used for preparing the composition. In some embodiments, the *Saccharomyces cerevisiae* TCI907 and/or the metabolites thereof can be used for preparing the compositions used for regulating blood glucose, losing weight, or reducing the production of advanced glycation end products. In addition, the *Saccharomyces cerevisiae* TCI907 and/or the metabolites thereof have/has a function of inhibiting an activity of amylase. The *Saccharomyces cerevisiae* TCI907 and/or the metabolites thereof have/has a function of depleting carbohydrates. In some embodiments, the *Saccharomyces cerevisiae* TCI907 has the functions of improving basic metabolic capacity of a host and reducing production of advanced glycation end products in the host. On such basis, the composition prepared with the *Saccharomyces cerevisiae* TCI907 and/or the metabolites thereof has at least one of the following effects: regulating blood glucose, reducing whole body fat percentage, reducing body weight, improving basic metabolic capacity, reducing damage caused by advanced glycation end products, or a combination thereof.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for regulating blood glucose of a subject comprising administering to the subject a composition comprising an effective amount of *Saccharomyces cerevisiae* TCI907 or supernatant thereof, wherein the *Saccharomyces cerevisiae* TC1907 is deposited at the German Collection of Microorganisms and Cell Cultures under an accession number of DSMZ33480, wherein the supernatant is obtained by the following steps: culturing the *Saccharomyces cerevisiae* TC1907 in a medium, centrifugating the cultured *Saccharomyces cerevisiae* TCI907 to separate the *Saccharomyces cerevisiae* TC1907 cells from a supernatant, thereby obtaining the supernatant.

2. The method of claim 1, wherein the *Saccharomyces cerevisiae* TC1907 or the supernatant thereof inhibits amylase activity to achieve the effect of regulating blood glucose.

3. The method of claim 1, wherein the *Saccharomyces cerevisiae* TCI907 depletes carbohydrates to achieve the effect of regulating blood glucose.

4. The method of claim 1, wherein the composition is in a capsule dosage form, and the effective amount of *Saccharomyces cerevisiae* TCI907 in the composition is $5 \times 10^7$ colony-forming unit/capsule (CFU/cap).

* * * * *